UNITED STATES PATENT OFFICE.

DANIEL G. SELL, OF KANSAS CITY, MISSOURI.

FOOD PRODUCT AND PROCESS OF MAKING THE SAME.

1,416,387.  Specification of Letters Patent.  Patented May 16, 1922.

No Drawing.  Application filed May 19, 1919. Serial No. 298,133.

*To all whom it may concern:*

Be it known that I, DANIEL G. SELL, a citizen of the United States, residing at Kansas City, in the county of Jackson and State of Missouri, have invented a certain new and useful Improvement in Food Products and Processes of Making the Same, of which the following is a specification.

My invention relates to improvements in food products and process of making the same.

It relates particularly to a process of making a food product having the nutritive and desirable qualities of peanut butter without its oily taste and tendency to stick to the mouth, which has a more pleasing taste, which is cheaper to manufacture, which is in convenient form for storage and shipment and which will not spoil during an extended period of time under adverse atmospheric conditions, and which will retain for an extended period of time its freshness, flavor and edible qualities.

In carrying my invention into effect, a substance which is rich in sugar, such as granulated or brown sugar, syrup, sorghum, honey or glucose in syrup form is boiled until it reaches a condition in which it would crystallize on cooling, then before cooling thoroughly mixing therewith peanut butter and permitting the mixture to harden. The product so obtained is a dry substance which may be easily pulverized and which will keep without spoiling or souring for an extended period of time.

When the product so made is desired to be used, it may be made into a paste which is ready for use by heating until thoroughly melted in water in proportions of substantially two parts of the product to one part of water.

Owing to the presence of the water in the paste so made, the paste will not have the keeping qualities of the dry hardened product, and for this reason the paste should be made only at the time it is to be used. In the mixing of the peanut butter with the boiled syrup, about two parts of peanut butter to one part of the boiled syrup may be employed.

By reducing the syrup in boiling to a condition in which it will crystallize on cooling, most of the water, which would otherwise reduce the keeping qualities of the product, is eliminated, by evaporation.

My improved product is much cheaper and has a more pleasing taste than ordinary peanut butter or peanut butter simply intermingled with ordinary sugar or honey, without the latter element being reduced by boiling to a condition in which crystallization would occur.

I have found that the best results are obtained by permitting the boiled syrup to cool to a temperature just below that in which crystallization would occur before mixing therewith the peanut butter, as too high a degree of heat tends to darken and to curdle the peanut butter, and to detract from its pleasing flavor. The intermingling of the peanut butter with the syrup boiled to the condition above described eliminates the well known tendency of the peanut butter to clog or stick to the roof of the mouth, which result is not obtainable by the mere intermingling of sugar in its ordinary form with the peanut butter.

I do not limit my invention to the precise steps above described, as many modifications, within the scope of the appended claim, may be made without departing from the spirit of my invention.

What I claim is:

A food product comprising a mixture of sugar and peanut butter which have been mixed together by boiling and allowed to crystallize, said crystallized sugar and peanut butter being of a consistency which will readily liquefy in substantially one part of water two parts of the product.

In testimony whereof I have signed my name to this specification.

DANIEL G. SELL.